United States Patent
Fong et al.

(10) Patent No.: US 7,142,548 B2
(45) Date of Patent: Nov. 28, 2006

(54) COMMUNICATING IN A REVERSE WIRELESS LINK INFORMATION RELATING TO BUFFER STATUS AND DATA RATE OF A MOBILE STATION

(75) Inventors: Mo-Han Fong, L'Original (CA); Jun Li, Richardson, TX (US); Sophie S. Vrzic, Nepean (CA); Ali Iraqi, Kanata (CA); Ashvin H. Chheda, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 172 days.

(21) Appl. No.: 10/800,119

(22) Filed: Mar. 12, 2004

(65) Prior Publication Data
US 2004/0223455 A1 Nov. 11, 2004

Related U.S. Application Data

(63) Continuation-in-part of application No. 10/793,056, filed on Mar. 4, 2004.

(60) Provisional application No. 60/499,584, filed on Sep. 2, 2003, provisional application No. 60/495,544, filed on Aug. 15, 2003, provisional application No. 60/478,792, filed on Jun. 16, 2003, provisional application No. 60/475,440, filed on Jun. 3, 2003, provisional application No. 60/469,778, filed on May 12, 2003, provisional application No. 60/469,106, filed on May 9, 2003, provisional application No. 60/468,442, filed on May 6, 2003, provisional application No. 60/462,220, filed on Apr. 11, 2003, provisional application No. 60/459,534, filed on Apr. 1, 2003, provisional application No. 60/457,215, filed on Mar. 25, 2003, provisional application No. 60/454,714, filed on Mar. 15, 2003, provisional application No. 60/452,370, filed on Mar. 6, 2003.

(51) Int. Cl.
| | |
|---|---|
| H04L 12/28 | (2006.01) |
| H04L 12/56 | (2006.01) |
| H04L 12/26 | (2006.01) |
| H04B 7/185 | (2006.01) |
| H04B 7/00 | (2006.01) |
| H04B 1/00 | (2006.01) |
| H04J 3/16 | (2006.01) |

(52) U.S. Cl. .................. 370/395.4; 455/522; 455/13.4; 455/69; 370/229; 370/318; 370/465

(58) Field of Classification Search ............. 370/395.4; 455/522, 69, 452.2, 13.4, 465, 229
See application file for complete search history.

(56) References Cited

U.S. PATENT DOCUMENTS

| 5,914,950 | A | 6/1999 | Tiedemann, Jr. et al. ... 370/348 |
| 6,510,148 | B1 * | 1/2003 | Honkasalo .................. 370/342 |
| 2004/0062206 | A1 * | 4/2004 | Soong et al. ............... 370/328 |
| 2004/0147276 | A1 * | 7/2004 | Gholmieh et al. .......... 455/522 |

(Continued)

FOREIGN PATENT DOCUMENTS

EP 1 213 894 6/2002

(Continued)

*Primary Examiner*—Lester G. Kincaid
*Assistant Examiner*—Marisol Figueroa
(74) *Attorney, Agent, or Firm*—Trop, Pruner & Hu, PC (57) ABSTRACT

A wireless communications network includes a mobile station and base station that are capable of communicating over a wireless link. Information relating to a status of a buffer in the mobile station and information relating to a data rate over a reverse wireless links is communicated over the reverse wireless link.

24 Claims, 5 Drawing Sheets

U.S. PATENT DOCUMENTS

2004/0160933 A1* 8/2004 Odenwalder et al. ....... 370/342
2005/0003843 A1* 1/2005 Ho et al. ................... 455/509
2005/0111358 A1* 5/2005 Hsu et al. .................. 370/229
2005/0176456 A1* 8/2005 Chen et al. ................ 455/522

FOREIGN PATENT DOCUMENTS

WO    WO 01/24568    4/2001

* cited by examiner

COMMUNICATING IN A REVERSE WIRELESS LINK INFORMATION RELATING TO BUFFER STATUS AND DATA RATE OF A MOBILE STATION

CROSS-REFERENCE TO RELATED APPLICATIONS

This claims the benefit under 35 U.S.C. § 119(e) of U.S. Provisional Applications Ser. Nos. 60/454,714, filed Mar. 15, 2003; 60/457,215, filed Mar. 25, 2003; 60/459,534, filed Apr. 1, 2003; 60/462,220, filed Apr. 11, 2003; 60/468,442, filed May 6, 2003; 60/469,106, filed May 9, 2003; 60/469,778, filed May 12, 2003; 60/475,440, filed Jun. 3, 2003; 60/478,792, filed Jun. 16, 2003; 60/495,544, filed Aug. 15, 2003; and 60/499,584, filed Sep. 2, 2003.

This is a continuation-in-part of U.S. patent application Ser. No. 10/793,056, entitled "AUTONOMOUS MODE TRANSMISSION FROM A MOBILE STATION," filed Mar. 4, 2004, which claims the benefit under 35 U.S.C. § 119(e) of U.S. Provisional Applications Ser. Nos. 60/452,370, filed Mar. 6, 2003; 60/454,714, filed Mar. 15, 2003; 60/457,215, filed Mar. 25, 2003; 60/459,534, filed Apr. 1, 2003; 60/462,220, filed Apr. 11, 2003; 60/468,442, filed May 6, 2003; 60/469,106, filed May 9, 2003; 60/469,778, filed May 12, 2003; 60/475,440, filed Jun. 3, 2003; 60/478,792, filed Jun. 16, 2003; 60/495,544, filed Aug. 15, 2003; and 60/499,584, filed Sep. 2, 2003.

Each of applications referenced above is hereby incorporated by reference.

TECHNICAL FIELD

The invention relates to communicating, in a reverse wireless link, information relating to buffer status and data rate of a mobile station.

BACKGROUND

A mobile communications network is typically made up of a plurality of cells. Each cell includes a radio base station, with each base station connected to a mobile switching center or a packet service node that manages communications sessions between mobile stations and terminals coupled to a public switched telephone network (PSTN) or a packet-based data network. Communications between mobile stations and base stations are performed over wireless links Traditional wireless protocols provide for circuit-switched communications. Such protocols include time-division multiple access (TDMA) protocols and code-division multiple access (CDMA) protocols. In a circuit-switched network, a channel portion between two endpoints (e.g., two mobile stations) is occupied for the duration of the connection between the endpoints.

However, with the wide availability of the Internet and intranets, packet-switched communications (e.g., web browsing, electronic mail, and so forth) have become more common. Generally, a circuit-switched connection is an inefficient mechanism for communicating packet data. As a result, third generation (3G) and beyond wireless technologies are being developed and implemented to provide higher bandwidth and more efficient packet-switched communications (of data as well as voice and other forms of real-time data) over wireless networks.

One example of a packet-switched wireless technology is defined by the CDMA 2000 family of standards, developed by the Third Generation Partnership Project 2 (3GPP2). A CDMA 2000 wireless communications network is capable of supporting both circuit-switched services and packet-switched services. For TDMA, packet-switched wireless communications protocols have also been developed, such as the Enhanced General Packer Radio Service (EGPRS) protocol as defined by the 3GPP (Third Generation Partnership Project) UMTS (Universal Mobile Telecommunications System) Release 1999 Standard, and others.

Packet-switched data communications is inherently bursty in nature. In other words, data is sent in short periods of bursts followed by intervals where no data is communicated. A base station typically includes a scheduler to schedule channels for a mobile station to transmit packet data over a reverse wireless link. However, the scheduling mechanisms employed by conventional base stations do not efficiently manage loading of the reverse wireless link for packet-switched communications.

SUMMARY

In general, according to one embodiment, a method for use in a wireless communications network includes communicating, in a reverse wireless link, information relating to a status of a buffer in the mobile station and information relating to a data rate of transmission over the reverse wireless link.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
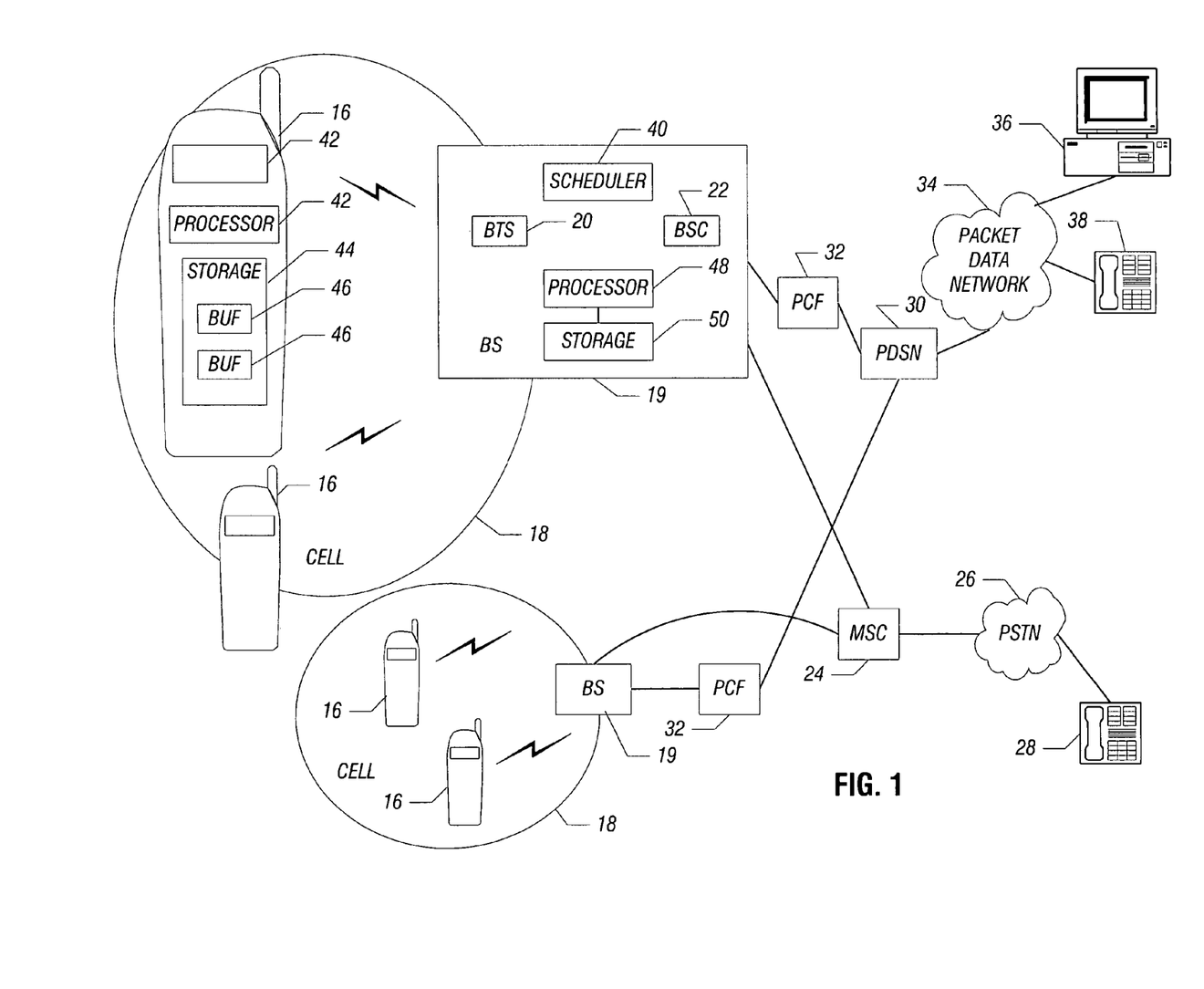
FIG. 1 is a block diagram of an example arrangement of a mobile or wireless communications network that incorporates an embodiment of the invention.

Referring to FIG. 1, a wireless or mobile communications network according to one embodiment includes components that operate according to CDMA (code-divisional multiple access) 2000. CDMA 2000 is defined by the CDMA 2000 family of standards (including the TIA-2000 standards, TIA-2001 standards, and the TIA-2000-D standards). However, in other embodiments, other types of wireless protocols can be used for communications in the wireless communications network, including other versions of CDMA, TDMA protocols, UMTS (Universal Mobile Telecommunications System) protocols, and other protocols.

The wireless communications network includes multiple cells 18, each including a base transceiver subsystem (BTS) 20 for performing radio telecommunications with mobile stations within the coverage area of the cell 18. The BTS entities 20 are connected to one or more base station controllers (BSCs) 22. Collectively, a BTS 20 and BSC 22 are referred to as a "base station" 19. More generally, a "base station" refers to any entity (or collection of entities) that communicates wirelessly with mobile stations and that exchanges control signaling with the mobile stations for establishing, terminating, or otherwise managing communication sessions (e.g., circuit-switched communications sessions, and so forth). Note that, in some implementations, multiple BTSs can be connected to each BSC.

For communicating circuit-switched voice traffic, the base station 19 is coupled to a mobile switching center (MSC) 24, which is responsible for switching mobile station-originated or mobile station-terminated circuit-switched traffic. Effectively, the MSC 24 is the interface for signaling and user traffic between the wireless network and other public switched networks (such as a public switched telephone network (PSTN) 26 or other MSCs. The PSTN 26 is connected to landline terminals, such as telephones 28.

In a voice call session between a mobile station (such as mobile station 16) and a landline terminal (such as telephone 28), voice traffic is routed through the air interface between the mobile station 16 and a base station 14, and through the base station 14, MSC 24, and PSTN 26.

The wireless communications network 10 also supports packet data services, in which packet data is communicated between a mobile station and another endpoint, which can be a terminal coupled to a packet data network 34 or another mobile station that is capable of communicating packet data. Examples of the packet data network 34 include private networks (such as local area networks or wide area networks) and public networks (such as the Internet). Packet data is communicated in a packet-switched communications session established between the mobile station and the other endpoint.

To communicate packet data, the base station 19 is coupled to a packet control function (PCF) module 32, which manages the relay of packets between the BSC 22 and a packet data serving node (PDSN) 30. The BSC 22 and PCF module 32 can be implemented on one platform or on multiple platforms. A "platform" generally refers to an assembly of hardware and software that provides predefined tasks.

The PDSN 30 establishes, maintains, and terminates link layer sessions to mobile stations, and routes mobile station-originated or mobile station-terminated packet data traffic. The PDSN 30 is coupled to the packet data network 34, which is connected to various endpoints, such as a computer 36 or a network telephone 38 (which is a telephone that is fitted with a network interface card for communications over packet data networks). Examples of packet-switched communications include web browsing, electronic mail, text chat sessions, file transfers, interactive game sessions, voice-over-IP (Internet Protocol) sessions, and so forth.

The wireless communications network thus provides two different types of communications: circuit-switched communications and packet-switched communications. Circuit-switched communications are routed through the MSC 24, while packet-switched communications are routed through the PDSN 30. In circuit-switched communications, a dedicated end-to-end channel is established for the duration of a call session. However, packet-switched communications utilize a connectionless intranetwork layer, such as that defined by the Internet Protocol (IP). In packet-switched communications, packets or other units of data carry routing information (in the form of network addresses) that are used to route the packets or data units over one or more paths to a destination endpoint.

One version of IP, referred to as IPv4, is described in Request for Comments (RFC) 791, entitled "Internet Protocol," dated Sep. 1981; and another version of IP, referred to as IPv6, is described in RFC 2460, "Internet Protocol, Version 6 (IPv6) Specification," dated December 1998.

In the ensuing discussion, reference is made to the transmission of packet data by a mobile station. However, note that techniques according to some embodiments of the invention can also be applied to circuit-switched communications.

In accordance with some embodiments of the invention, a reverse request message is sent in the reverse wireless link from the mobile station to the base station. The reverse request message contains at least two types of information: the maximum supportable data rate of the mobile station, and the status of buffer(s) in the mobile station. Buffer status refers to an occupancy of a buffer or buffers.

The buffer status and maximum data rate information communicated in the reverse request message enables a scheduler 40 in the base station 19 to provision for the amount of ROT (rise-over-thermal) or load in the reverse wireless link that is occupied by users. ROT, or rise-over-thermal, is defined as the ratio of total interference over thermal noise power. ROT is basically a measure of the loading of the reverse wireless link. In other implementations, other measures of loading of the reverse wireless link can be used.

A mobile station can transmit in one of two modes: autonomous mode and scheduled mode. In scheduled mode, an explicit assignment of the data rate is provided by the scheduler 40 in the base station 19 to the mobile station 16. In autonomous mode, a mobile station 16 containing data to transmit does not have to wait for the scheduler 40 to schedule a channel for the mobile station 16. Instead, the mobile station 16 is able to autonomously send data over the reverse wireless link at a data rate that is less than or equal to a specified maximum autonomous data rate (specified by the base station 19). Effectively, in autonomous mode, the mobile station 16 is able to transfer packet data at a data rate up to the maximum autonomous data rate without an explicit scheduled rate assignment received in either layer 2 signaling or layer 3 signaling messages from the scheduler 40 in the base station 19.

As further shown in FIG. 1, each mobile station 16 includes a processor 42 and a storage 44. The processor 42 provides a processing core on which one or more software modules are executable to enable the mobile station to perform various tasks. Also, the mobile station 16 includes buffers 46 for temporarily holding data that are to be communicated over the reverse wireless link to the base station 19. The base station 19 also includes a processor 48 and a storage 50 (or multiple processors and storages). The scheduler 40 can be a software module that is executable on the processor 48.

Because mobile stations are able to transmit autonomously, a base station 19 is unable to directly control through the use of data rate assignment messages the loading of the reverse wireless link. Therefore, according to some embodiments, a mechanism that takes into account the autonomous transmitting capability of mobile stations is provided to enable the scheduler 40 in the base station 19 to efficiently schedule usage of the air interface between mobile stations and the base station.

To determine the bandwidth requirements of the mobile stations being served by the base station 19, the scheduler 40 uses the buffer status and maximum supportable data rate information provided in the reverse request message. In this manner, the scheduler 40 can determine a data rate to grant each mobile station in scheduled mode. Also, in one implementation, the scheduler 40 can use the reverse request message information to determine how much of the bandwidth of the reverse wireless link will be taken up by the autonomous mode mobile stations (the mobile stations transmitting in autonomous mode). Any remaining bandwidth of the reverse wireless link can then be allocated to scheduled mode mobile stations by the scheduler 40 explicitly assigning data rates to the scheduled mode mobile stations. In scheduled mode, assignment of a data rate to a mobile station can be performed by the base station sending a grant message in a grant channel (GCH) to a mobile station.

In accordance with an embodiment of the invention, the reverse request message is communicated from the mobile station to the base station on a reverse request channel (R-REQCH). Packet data is communicated from the mobile station to the base station in a reverse packet data channel (R-PDCH). In one implementation, the message format of a reverse request message is as follows:

| FIELD | LENGTH (bits) |
|---|---|
| RESERVED | 1 |
| MAXIMUM_TPR | 4 |
| SR_ID | 3 |
| EVENT | 4 |

The length of each field is provided for the purpose of example. Other implementations can use other lengths of the fields. In the reverse request message, the MAXIMUM_TPR field indicates the maximum traffic-to-pilot ratio for the reverse packet data channel. The traffic-to-pilot ratio represents the ratio of the energy of traffic channels to the pilot channel. The maximum traffic-to-pilot ratio is used as an indication of the maximum supportable data rate, where a higher traffic-to-pilot ratio implies a higher data rate.

The SR_ID field in the reverse request message contains a service reference identifier (sr_id) to identify a service instance. A mobile station is capable of being involved in multiple communications sessions to provide multiple respective services (each such service is also referred to as a service instance). Examples of services include a voice-over-IP service, a web browsing service, an electronic mail service, a text chat service, a file download service, an interactive gaming service, and so forth. Multiple concurrent communications sessions for respective services can be set up by a mobile station 16. The SR_ID field is set to the service reference identifier of the service instance that caused generation of a trigger for transmission of a reverse request message. Alternatively, the SR_ID field can be set to a predetermined value, such as "111," if the trigger that caused the reverse request message to be sent is associated with a combination of service instances.

Instead of, or in addition to the SR_ID field, a service or scheduling class field can also be included. A service class indicates a level of service the scheduler 40 in the base station should provide to the mobile station. The base station can assign the same service class to more than one service instance of a mobile station.

Another field, the EVENT field, contains an event code that corresponds to the buffer status of the mobile station. The buffer status indicates the amount of data stored in a buffer for a service instance. The event code is derived from an event code table stored in the mobile station that associates ranges of data amounts with corresponding codes. In some implementations, the event code table is configured by the base station during call setup or within an active call. Effectively, reporting the buffer status in the EVENT field allows the base station to know how much data the mobile station has, and thus to decide the scheduling priority and what data rate to assign the mobile station in scheduled mode.

In sum, the reverse request message contains information to enable the scheduler 40 in the base station 19 to determine data rate requirements of a corresponding mobile station. The MAXIMUM_TPR value provides insight into the maximum data rate supportable by the mobile station, based on power constraints. The EVENT field indicates the status of a buffer in the mobile station for a particular service instance. The buffer status can be used by the scheduler 40 to determine an expected data rate requirement on a reverse channel (e.g., R-PDCH). Thus, whereas the MAXIMUM_TPR field provides an indication of a power-limited data rate for transmissions on R-PDCH, the EVENT field provides an indication of a buffer-limited data rate for transmissions on R-PDCH.

In alternative embodiments, other combinations of fields in the reverse request message can be used. For example, instead of having separate MAXIMUM_TPR and EVENT fields to represent power headroom and buffer status information, one field can be employed. This one field (referred to as a CODE field) can convey either power-related information (a code to represent the maximum TPR or a power-limited data rate) or buffer-related information (a code to represent buffer status or a buffer-limited data rate). Another field, referred to as a STATUS field, in the reverse request message can be used to indicate whether the CODE field is carrying power-related information or buffer-related information. Thus, effectively, in this alternative embodiment, if the STATUS field has a first value, then the CODE field contains information indicative of data rate that is based on buffer occupancy (the amount of data present in a buffer for a particular service instance). However, if the STATUS field has a second value, then the CODE field contains information indicative of data rate that is based on power headroom.

Power-related information can be in the form of (1) a maximum power-limited data rate, (2) a maximum power-limited effective traffic-to-pilot ratio, (3) the actual power headroom remaining in the mobile station in dBm, (4) the actual mobile station pilot transmit power in dBm, or (5) an encoded value representing any of the above. The buffer-related information can be in the form of (1) a maximum buffer-limited data rate the mobile station can transmit, (2) the actual buffer occupancy in bytes or other units, (3) the quantized buffer level in the mobile station, or (4) an encoded value representing any of the above.

In addition to enabling load management of the reverse wireless link (e.g., R-PDCH), the reverse request messages sent by each mobile station also allows for outer loop power control on the reverse link, according to some implementations. Outer loop power control refers to controlling the power of transmission over a wireless link based on detected data error rates (such as errors in frames or in data bits). For example, the reverse request message sent on R-REQCH can be used for power control when actual data (such as data on R-PDCH) is not being transmitted for some extended period of time.

Figure 2:
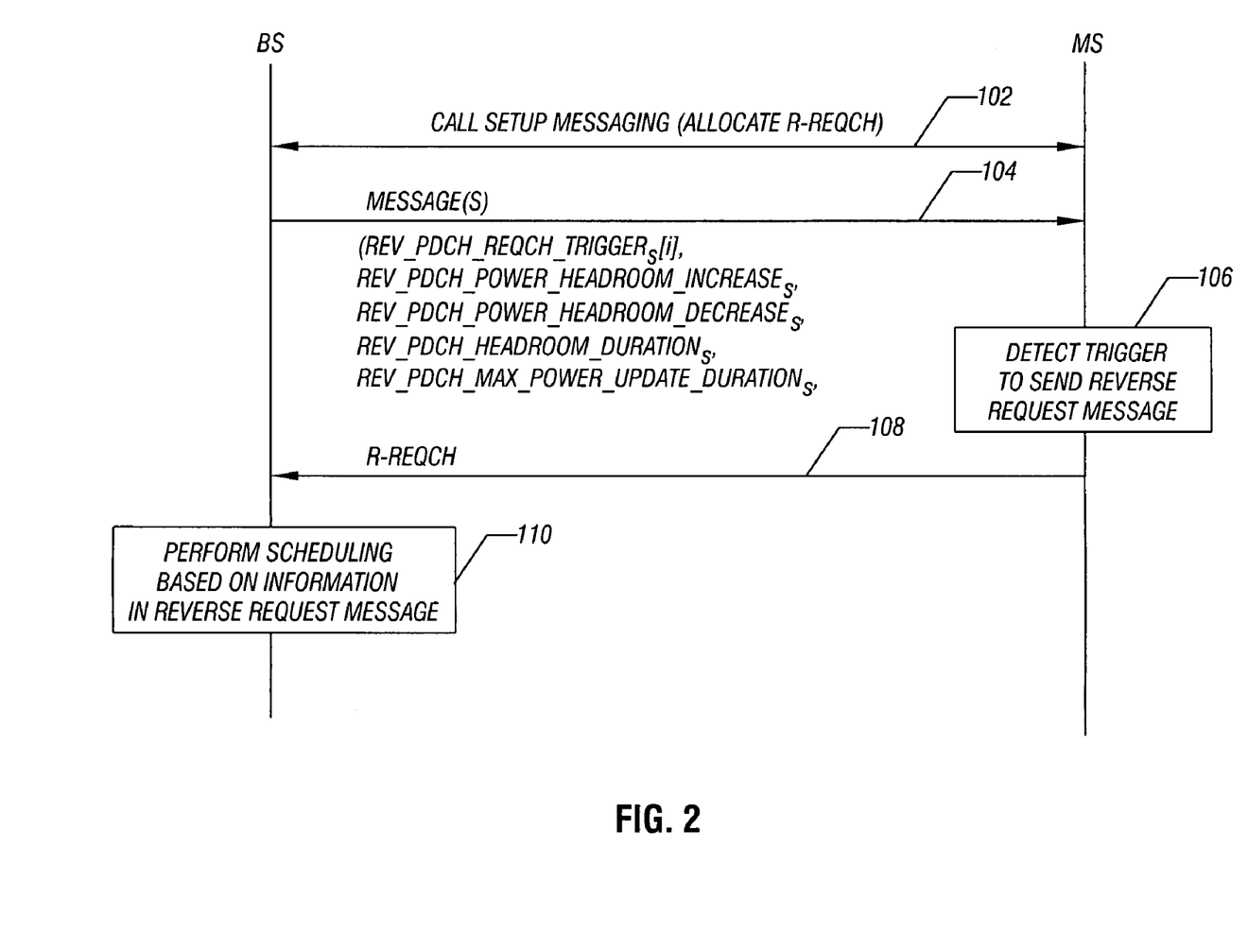
FIG. 2 is a message flow diagram of signaling between a base station and a mobile station, in accordance with an embodiment.

FIG. 2 is a message flow diagram of a procedure according to one embodiment for communicating reverse request messages containing buffer status and data rate information over a reverse wireless link. Initially, call setup messaging is exchanged (at 102) between the base station 19 and the mobile station 16. As part of this call setup messaging, the base station can allocate a reverse request channel (R-REQCH) to the mobile station. Allocation of R-REQCH enables the mobile station to communicate buffer status and data rate information to the mobile station. The base station sends (at 104) various messages to the mobile station, with such message(s) containing trigger parameters that are used by the mobile station to trigger the transmission of a reverse request message on R-REQCH. The message(s) sent at 104 can be performed as part of the call setup procedure, or the message(s) can be sent by the base station to the mobile station at any time during the active state of the mobile station. For example, the trigger parameters can be communicated whenever a new service is being instantiated. Usually, call setup needs to be performed only once, with the mobile station being able to provide multiple services in one call session. An example message that is sent by the base station to the mobile station to instantiate a new service is a Service Connect Message (SCM). Messages containing the trigger parameters can also be sent during handoff procedures, such as soft handoff procedures. An example message that is communicated during a soft handoff procedure is a Universal Handoff Direction Message (UHDM). Other messages can be used to communicate the trigger parameters in other embodiments.

Examples of trigger parameters that are sent by the base station to the mobile station include REV_PDCH_REQCH_TRIGGER$_s$[i] (where i represents a particular service instance), REV_PDCH_POWER_HEADROOM_INCREASE$_s$, REV_PDCH_POWER_HEADROOM_DECREASE$_s$, REV_PDCH_HEADROOM_DURATION$_s$, and REV_PDCH_MAX_POWER_UPDATE_DURATION$_s$.

The REV_PDCH_REQCH_TRIGGER$_s$[i] parameter contains at least the following fields: MIN_DURATION, to indicate a minimum duration at which a mobile station should send a reverse request message to the base station; and USE_POWER_REPORTS, to indicate if a change in power headroom by a specified amount at the mobile station is to be used to trigger the transmission of a reverse request message for the particular service instance i. The REV_PDCH_REQCH_TRIGGER$_s$[i].MIN_DURATION field is set at a value to prevent the mobile station from transmitting reverse request messages too frequently.

The REV_PDCH_POWER_HEADROOM_INCREASE$_s$ and REV_PDCH_POWER_HEADROOM_DECREASE$_s$ parameters are used to define respectively the amount of power headroom increase and decrease at the mobile station that will trigger the transmission of a reverse request message. Power headroom refers to the available transmit power for transmitting data on a reverse traffic channel, including the reverse packet data channel (R-PDCH).

The REV_PDCH_HEADROOM_DURATIONs parameter indicates another duration, different from REV_PDCH_REQCH_TRIGGER$_s$[i].MIN_DURATION, for indicating whether a reverse request message should be transmitted in response to detecting that a sufficient change in power headroom has triggered transmission of a reverse request message. The REV_PDCH_HEADROOM_DURATION$_s$ is set at a value to prevent the mobile station from transmitting reverse request messages too frequently when triggered by power headroom changes.

The REV_PDCH_MAX_POWER_UPDATE_DURATION$_s$ parameter is used to indicate a maximum duration after with the mobile station must transmit a reverse request message if other criterion(ia) is(are) satisfied. This duration is provided to specify a maximum period between transmissions of reverse request messages by a mobile station. In one specific embodiment, this periodic transmission of reverse request messages after every REV_PDCH_MAX_POWER_UPDATE_DURATIONs can be used for the purpose of reverse link outer-loop power control based on frame quality of the reverse request message.

The parameters listed above are provided for purposes of example, as other trigger parameters can be used in other embodiments.

Next, the mobile station detects (at 106) whether a trigger has occurred to send a reverse request message. If a trigger has occurred, based on the trigger parameters sent by the base station to the mobile station, the mobile station sends (at 108) a reverse request message on R-REQCH. Next, the base station performs (at 110) scheduling based on information in the reverse request message.

Figure 3:
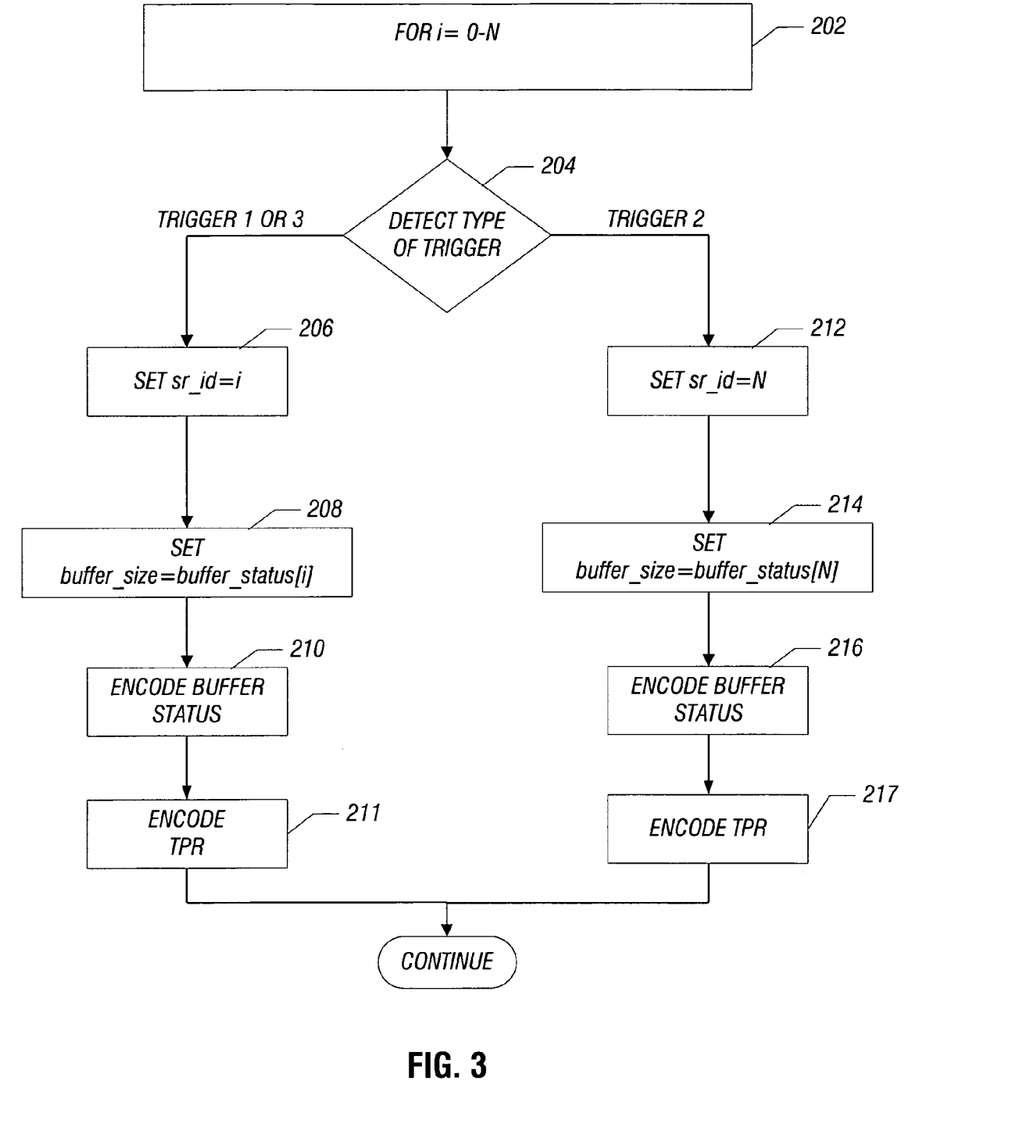
FIG. 3 is a flow diagram of a procedure that triggers transmission of a reverse request channel (R-REQCH) over a reverse wireless link, in accordance with an embodiment.

FIG. 3 is a flow diagram of a process performed by a mobile station to determine whether a reverse request message is to be sent to a base station. The mobile station iteratively performs (at 202) the process for all active service instances i, where i=0–N (N being a value from 0 to some predetermined maximum number of service instances that can be active in a call). The mobile station detects (at 204) if a trigger condition is satisfied for the service instance i.

There are at least three triggers for sending a reverse request message. A first trigger is a buffer update trigger. This trigger involves determining whether the state of the parameter field REV_PDCH_REQCH_TRIGGER$_s$[i].USE_BUFFER_REPORTS is true, and whether a current system time (the time provided by the clock of the mobile station) exceeds a time at which a reverse request message was last transmitted for the service instance i by the predetermined time duration specified by REV_PDCH_REQCH_TRIGGER$_s$[i].MIN_DURATION. The current system time is saved in a parameter saved_sys_time. The time that a reverse request message was last sent for the service instance i is stored in a parameter last_time_reported[i]. Thus, for a particular service instance i, if REV_PDCH_REQCH_TRIGGER$_s$[i].USE_BUFFER_REPORTS is true, and if saved_sys_time is equal to or greater than (last_time_reported[i]+REV_PDCH_REQCH_TRIGGER$_s$[i].MIN_DURATION), then that is a trigger (referred to as trigger 1) to send a reverse request message for the purpose of updating the buffer status to the base station.

In preparing the reverse request message for transmission, the SR_ID field of the reverse request message is set (at 206) to i. Also, a parameter buffer_size is set (at 208) to buffer_status [i], where buffer_status[i] contains the amount of data in the buffer used to store data to be sent by the mobile station over the reverse wireless link for the service instance i. Also, based on the value of buffer_size, an event code is generated from the event code table stored in the mobile station. Generation of the event code is referred to as encoding (at 210) the buffer status. The event code is provided as the EVENT field in the reverse request message.

A first example event code table is provided below:

| Row | Buffer Size (in units of 96 bytes) |
| --- | --- |
| 1 | 1 |
| 2 | 2 |
| 3 | 4 |
| 4 | 6 |
| 5 | 8 |
| 6 | 12 |
| 7 | 16 |
| 8 | 24 |
| 9 | 32 |
| 10 | 64 |
| 11 | 80 |
| 12 | 96 |
| 13 | 128 |

A second example event code table is provided below:

| Row | Buffer Size (in units of 512 bytes) |
| --- | --- |
| 1 | 1 |
| 2 | 2 |
| 3 | 4 |
| 4 | 6 |
| 5 | 8 |
| 6 | 12 |
| 7 | 16 |
| 8 | 24 |
| 9 | 32 |
| 10 | 64 |
| 11 | 80 |
| 12 | 96 |
| 13 | 128 |

According to some implementations, one of the buffer tables can selectively be used to derive the value of the EVENT field. The value of buffer_size is compared to each entry of a selected one of the buffer tables. Each entry in the selected table is referred to as REV_PDCH_BUFFER_SIZE$_s$[sr_id][j], where j=1–13. Iterating through j=1–13, if buffer_size is less than REV_PDCH_BUFFER_SIZE$_s$[sr_id][j], then the EVENT field is set to a binary encoding of j+1.

The event code tables are provided for the purpose of example. In other implementations, other event code tables. Alternatively, the value of the EVENT field can be set according to a formula.

In addition, the mobile station also encodes (at 211) a value for the MAXIMUM_TPR field based on the current power headroom of the mobile station. The reverse request message containing the values set above is then sent on R-REQCH to the base station.

Another trigger (referred to as trigger 2) that causes transmission of the reverse request message involves determining whether a maximum duration has elapsed during which a reverse request message has not been sent. For the scheduler 40 in the base station to accurately perform scheduling to properly arrange loading on R-PDCH, the scheduler 40 needs accurate buffer status and power headroom (data rate) information. Waiting too long between reverse request messages may result in inaccurate information being used by the base station. Thus, trigger 2 relates to ensuring that the mobile station does not wait too long between transmission of the reverse request messages to the base station. According to trigger 2, if saved_sys_time (the current mobile station system time) minus last_req_sent (the time at which a reverse request message was last sent for any service instance) is greater than or equal to REV_PDCH_MAX_POWER_UPDATE_DURATION$_s$, and buffer_status[N] is greater than zero, then a trigger to send the reverse request message has occurred.

The buffer_status[N] parameter contains the sum of the buffer_status[i] parameters (i=0 to N−1) for corresponding service instances. In other words, if the difference between the current time and the time at which a reverse request message (for any service instance) was last sent exceeds REV_PDCH_MAX_POWER_UPDATE_DURATION$_s$, and the buffer for any of the service instances contains data to transmit over the reverse wireless link, then trigger 2 has occurred.

In preparing the reverse request message to send for trigger 2, the SR_ID field of the reverse request message is set (at 212) to N, and buffer_size is set (at 214) to buffer_status[N]. Also, the event code is determined (at 216) based on the event code table and provided as the EVENT field of the reverse request message. A code for MAXIMUM_TPR is also generated (at 217). The reverse request message containing the values set above is then sent on R-REQCH.

A third trigger (trigger 3) is a power change trigger. This trigger is based on a determination of whether the current power headroom (current_power_headroom) differs from a prior power headroom (last_power_headroom) by greater than a predetermined amount, as indicated by the REV_PDCH_POWER_HEADROOM_INCREASE$_s$ or REV_PDCH_POWER_HEADROOM_DECREASE$_s$ parameter. If there is a sufficient change in power headroom, and if the current system time (saved_sys_time) exceeds the time at which a reverse request message was last sent (last_req_sent) by greater than or equal to REV_PDCH_HEADROOM_DURATION$_s$, and if buffer_status[i] is greater than zero (which indicates there is data in the buffer to send over the reverse wireless link for service instance i), then trigger 3 has occurred. More specifically, trigger 3 is true if all three of the following are true:

(1) (current_power_headroom−last_power_headroom)
  >REV_PDCH_POWER_HEADROOM_INCREASE$_S$, or (current_power_headroom−last_power_headroom)<−
  REV_PDCH_POWER_HEADROOM_DECREASE$_S$;
(2) saved_sys_time ≧ (REV_PDCH_HEADROOM_DURATION$_S$+last_req_sent); and
(3) buffer_status[i] >0.

If trigger 3 has occurred, then processing proceeds according to 206, 208, 210, and 211 to prepare the reverse request message to send on R_REQCH.

The various tasks of FIGS. 2 and 3 discussed above, including the tasks of communicating (transmitting or receiving) messages or parameters, preparing information to send, and so forth, are executable by components of either the base station or mobile station. For example, the mobile station may include a chipset (made up of a processor, and/or microcontroller, and other associated components) for performing the communication and other tasks.

As discussed above, autonomous mode and scheduled mode transmission of packet data can be performed. The types of data transmissions that can benefit from autonomous mode transmission include data traffic that is delay-sensitive and stream-like (rather than bursty). For example, interactive gaming sessions over a packet data network involve streaming data that is delay-sensitive. Other types of data transmissions that can benefit from autonomous mode transmission include low-rate signaling traffic. Note, however, that autonomous mode transmission over a reverse wireless link is not to be limited to only the traffic mentioned above, but rather can be applied to any type of traffic.

In autonomous mode, a mobile station 16 containing data to transmit does not have to wait for the scheduler 40 in the base station 19 to schedule a reverse channel for the mobile station 16. Instead, the mobile station 16 is able to autonomously send data over the reverse channel (e.g., R-PDCH) at a data rate that is less than or equal to a specified maximum autonomous data rate. Effectively, in autonomous mode, the mobile station 16 is able to transmit packet data at a data rate up to the maximum autonomous data rate without an explicit, scheduled rate assignment received in either layer 2 signaling or layer 3 signaling messages from the scheduler 40 in the base station 19.

The maximum autonomous data rate is specified by an indicator (in the form of a parameter) sent by the base station 19 to the mobile station 16. According to one implementation, the parameter is named $REV\_PDCH\_MAX\_AUTO\_TPR_s$, which refers to the maximum autonomous traffic-to-pilot ratio (TPR) on R-PDCH. R-PDCH is used for transmitting packet data from the mobile station over the reverse wireless link. The traffic-to-pilot ratio is used by the mobile station to calculate a corresponding data rate. A higher the traffic-to-pilot ratio implies a higher data rate.

Each mobile station 16 can be assigned a different $REV\_PDCH\_MAX\_AUTO\_TPR_s$ parameter. This enables the base station 19 to assign different maximum autonomous data rates to different mobile stations 16, if desired.

Another parameter that is sent from the base station 19 to the mobile station 16 regarding the autonomous mode of transmission is a flag to indicate whether autonomous mode is enabled. In one implementation, the flag is named $REV\_PDCH\_AUTO\_ALLOWED_s[i]$, where i is a service reference identifier (sr_id) to identify a service for which data is to be transmitted by the mobile station. For example, packet data that can be communicated by a mobile station 16 includes packet data for a voice-over-IP service, a web browsing service, an e-mail service, a text chat service, a file download service, an interactive gaming service, and so forth. Multiple concurrent communications sessions for respective services can be setup by the mobile station 16. For each such service having a reference identifier $sr\_id_x$, the state of $REV\_PDCH\_AUTO\_ALLOWED_s[sr\_id_x]$ is set (to logical "1" to indicate that autonomous mode transmission is enabled for the service having reference identifier $sr\_id_x$, and to logical "0" to indicate that autonomous mode transmission is disabled for the service having reference identifier $sr\_id_x$). Thus, for example, autonomous mode may be enabled for an interactive gaming session, where the communication of data is relatively delay sensitive. On the other hand, autonomous mode may be disabled for a file download session or web browsing session, since these types of data communications are less delay sensitive.

The base station 19 is able to send autonomous mode parameters, including $REV\_PDCH\_MAX\_AUTO\_TPR_s$ and $REV\_PDCH\_AUTO\_ALLOWED_s[i]$, in various messages, which can be sent during a call setup procedure or at other times (such as after a call has been established and the mobile station is in an active state). According to one implementation, examples of such messages include an Extended Channel Assignment Message for assigning a channel to a mobile station. Another message is a Service Connect Message (SCM), sent to establish a service instance either at call setup or during a call. Another message that can carry the autonomous mode parameters mentioned above is a Universal Handoff Direction Message (UHDM), which is sent at any time during a call. In other implementations, other messages can be employed to carry the autonomous mode parameters. Such messages are sent in the forward wireless link from the base station to the mobile station.

Although reference is made to specific autonomous mode parameters in this discussion, it is noted that other autonomous mode parameters to define autonomous mode transmission over a reverse wireless link can be employed in other embodiments.

Figure 4:
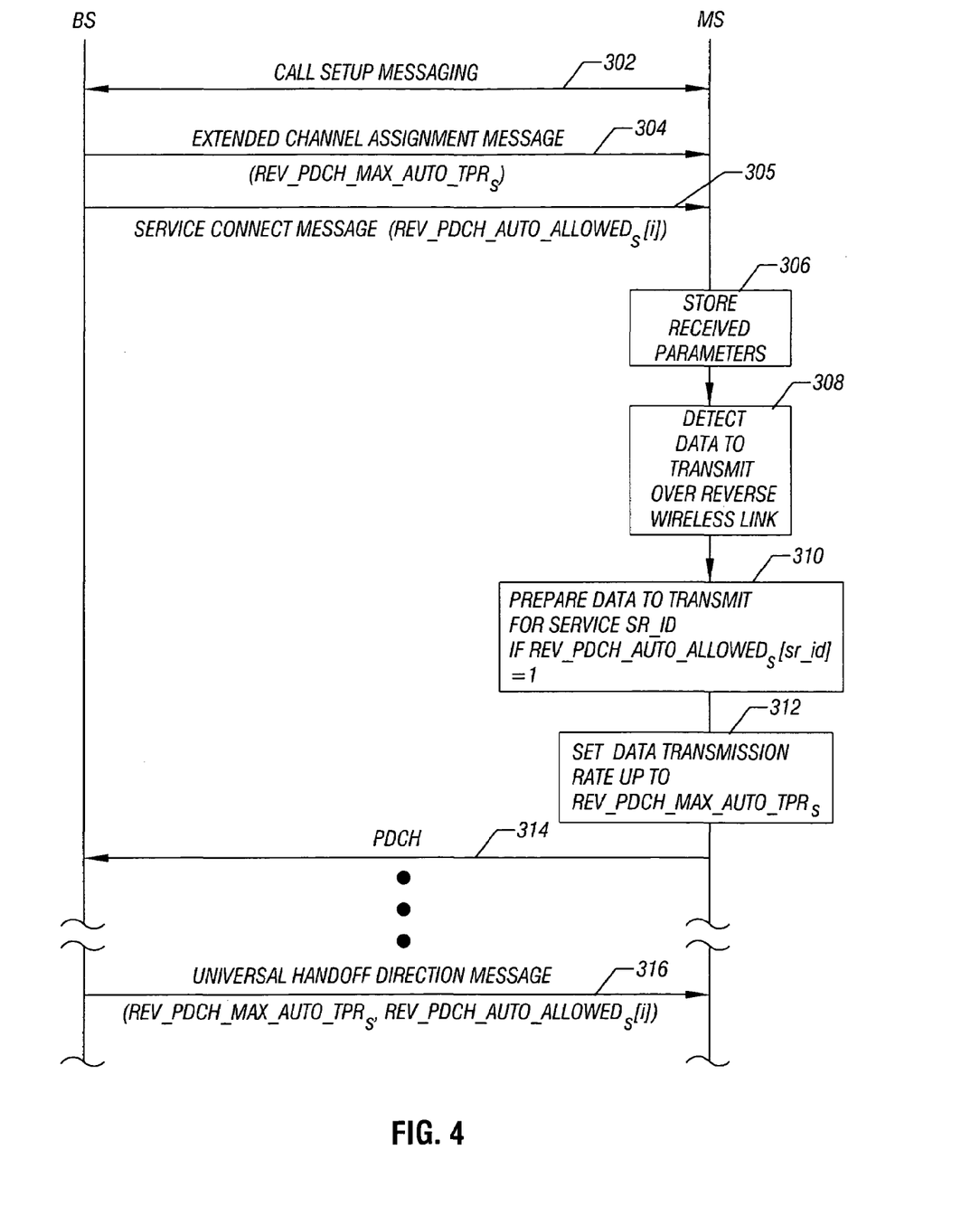
FIG. 4 is a message flow diagram of a procedure for enabling autonomous communication of data from the mobile station to the base station at a rate up to a maximum autonomous data rate, in accordance with an embodiment of the invention.

FIG. 4 illustrates a message flow diagram involving a base station and mobile station. Call setup messaging is initially exchanged (at 302) between the base station and the mobile station to establish a call. As part of call setup, the base station sends (at 304) an Extended Channel Assignment Message, which includes the $REV\_PDCH\_MAX\_AUTO\_TPR_s$ message, according to one implementation. Also, the base station sends (at 305) a Service Connect Message (SCM) to the mobile station. The Service Connect Message includes the $REV\_PDCH\_AUTO\_ALLOWED_s[i]$. Note that the Service Connect Message can also be transmitted from the base station to the mobile station after call setup has completed. This is usually performed to establish new service instances (to provide additional services) between the mobile station and the base station. Call setup need only be performed once, with the mobile station being able to provide multiple services in one call session.

In other implementations, the $REV\_PDCH\_MAX\_AUTO\_TPR_s$ and $REV\_PDCH\_AUTO\_ALLOWED_s[i]$ messages can both be carried in the Extended Channel Assignment Message or in the Service Connect Message.

The received autonomous mode parameters are stored (at 306) by the mobile station 16. The mobile station 16 next detects (at 308) that it has packet data to transmit over the reverse wireless link. Packet data to be transmitted is stored in the buffers 46 (FIG. 1) of the mobile station 16. If the mobile station has established multiple sessions for multiple corresponding services, then the buffers 46 would contain packet data for the multiple sessions.

For each service having a corresponding service reference identifier $sr\_id_x$, if $REV\_PDCH\_AUTO\_ALLOWED_s[sr\_id_x]$ has the logical "1" state, then packet data for that service is prepared for transmission (at 310) by the mobile station. The data transmission rate is set (at 312) at a rate up to $REV\_PDCH\_MAX\_AUTO\_TPR_s$. Note that the data rate that the mobile station actually transmits at can be limited by the status of the buffers (referred to as a buffer-limited data rate) or by power headroom (referred to as a power-limited data rate). The data is then sent (at 314) over a reverse packet data channel (R-PDCH). While the mobile station remains in its active state, the base station can send (316) additional messages to the mobile station to either change the value of $REV\_PDCH\_MAX\_AUTO\_TPR_s$ and $REV\_PDCH\_AUTO\_ALLOWED_s[i]$ for an existing service, or to set the value of $REV\_PDCH\_MAX\_AUTO\_TPR_s$ and $REV\_PDCH\_AUTO\_ALLOWED_s[i]$ for new services. As noted above, one such message is the Service Connect Message. Alternatively, the base station can send a Universal Handoff Direction Message (UHDM) to the mobile station, which is typically performed during a handoff procedure when the mobile station travels from one cell (or cell sector) to another cell (or cell sector).

In a different implementation, another message can be used to change the values of $REV\_PDCH\_MAX\_AUTO\_TPR_s$ and $REV\_PDCH\_AUTO\_ALLOWED_s[i]$. For example, a message can be sent by the base station to the mobile station to increment or decrement the value of $REV\_PDCH\_MAX\_AUTO\_TPR_s$ by a predetermined amount. Another message can also be sent by the base station to the mobile station for toggling the state of REV_P-DCH_AUTO_ALLOWED$_s$[i].

A mobile station not scheduled by the base station can transmit autonomously up to the maximum autonomous data rate, subject to the certain rules as described below in connection with FIG. 5. A reverse request message sent on R-REQCH is communicated from the mobile station to the base station to indicate the buffer status and maximum data rate that is supportable by the mobile station. This buffer status and maximum supportable data rate information that are communicated in the reverse request message on R-REQCH is used by the scheduler 40 to grant a data rate to the mobile station. Optionally, the scheduler 40 can also use the information to determine how much bandwidth is available for other communications (such as for other mobile stations). A fixed time offset T2 is defined between the R-REQCH frame boundary (e.g., boundary 402) and the frame boundary of R-PDCH (e.g., boundary 404).

Figure 5:
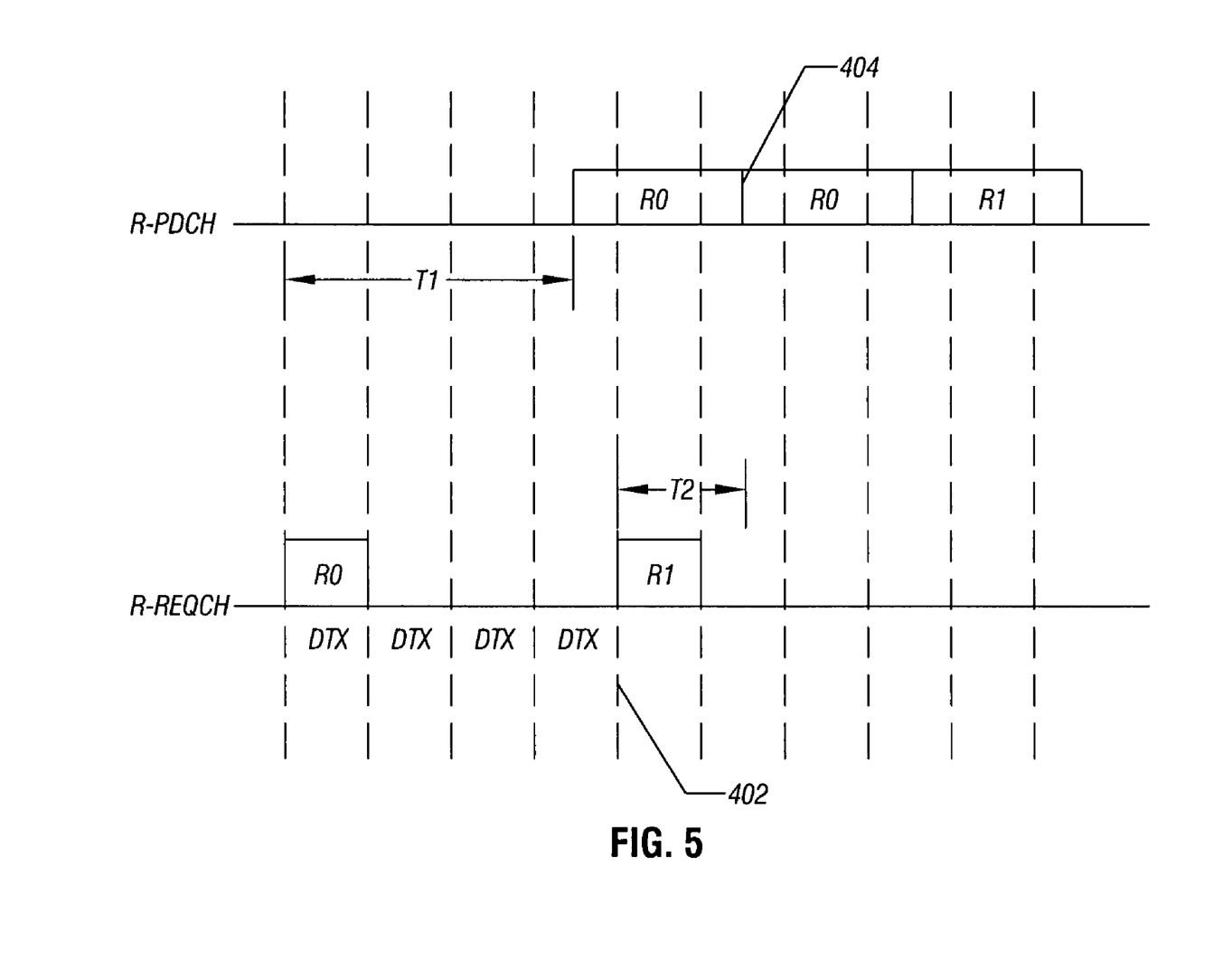
FIG. 5 is a timing diagram to illustrate timing relationships between R-REQCH messages and frames transmitted on a reverse packet data channel (R-PDCH), in accordance with an embodiment.

A further rule that is adhered to by mobile stations according to some embodiments is that the data rate transmitted in a particular 10-ms (millisecond) period is based on the latest reverse request message information (e.g., R0 or R1 shown in FIG. 5). The reverse request message are sent at least a time offset T1 prior to the transmission of the R-PDCH frame corresponding to the reverse request message. The time offset T1 provides sufficient time for the scheduler 40 to process the information communicated in R-REQCH so that appropriate scheduling can be performed. In other words, the R-REQCH information has to be communicated from the mobile station to the base station at least a time T2 prior to the mobile station actually transmitting the packet data over R-PDCH.

The time offset T2 between the information reported in the reverse request channel R-REQCH and the data rate transmitted on R-PDCH allows time for the scheduler 40 in the base station 19 to provision for the amount of ROT (rise-over-thermal) or load in the reverse wireless link that is occupied by users transmitting in autonomous mode. The remaining ROT or load available in the air interface is assigned to scheduled mode mobile stations.

ROT, or rise-over-thermal, is defined as the ratio of total interference over thermal noise power. ROT is basically a measure of the loading of the reverse wireless link. In other implementations, other measures of loading of the reverse wireless link can be used.

The scheduler 40 can also control the ROT or load of the reverse wireless link by setting values for the parameter REV_PDCH_MAX_AUTO-TPR$_s$ for the mobile stations in a cell or cell sector that are capable of transmitting in autonomous mode. To reduce the loading of the reverse wireless link, the scheduler 40 can reduce REV_PDCH_MAX_AUTO TPR$_s$ for each mobile station. Reducing the loading of autonomous load transmissions provides greater bandwidth for other forms of transmissions in the reverse wireless link, such as scheduled mode transmissions.

Instructions of the various software modules discussed herein (such as the scheduler 40 and other software executable in base station 19 or mobile station 16) are loaded for execution on corresponding control units or processors, such as the processor 42 in the mobile station and the processor 48 in the MSC base station 19. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules) are stored in one or more machine-readable storage media, such as storage 44 in the mobile station 16 and storage 50 in the base station 19. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a wireless communications network, comprising:
   sending, from a base station to a mobile station, at least one trigger parameter corresponding to a trigger condition, the at least one trigger parameter comprising at least one of a first parameter relating to power headroom increase at the mobile station, and a second parameter relating to power headroom decrease at the mobile station;
   in response to occurrence of the trigger condition, receiving in a reverse wireless link, information relating to status of a buffer in the mobile station and receiving information relating to a data rate used by the mobile station when transmitting over the reverse wireless link.

2. The method of claim 1, wherein receiving information relating to the status of the buffer comprises receiving information relating to an occupancy of a data buffer.

3. The method of claim 1, wherein receiving information relating to the data rate comprises receiving information relating to a maximum data rate supportable by the mobile station over the reverse wireless link.

4. The method of claim 3, wherein receiving information relating to the maximum data rate supportable by the mobile station comprises receiving a traffic-to-pilot ratio to indicate the maximum data rate supportable by the mobile station.

5. The method of claim 1, further comprising detecting whether the trigger condition has occurred.

6. The method of claim 1, further comprising sending at least one other trigger parameter corresponding to at least one other trigger condition, wherein the at least one other parameter comprises a parameter relating to a maximum time duration between communicating the information relating to the status of the buffer and the information relating to the data rate.

7. The method of claim 1, wherein receiving the information relating to a status of a buffer in the mobile station and information relating to a data rate over the reverse wireless link comprises receiving the information relating to the status of the buffer and information relating to the data rate in a reverse request message.

8. The method of claim 7, wherein receiving the reverse request message comprises receiving the reverse request message on a reverse request channel (R-REQCH).

9. The method of claim 8, wherein receiving the reverse request message comprises receiving the reverse request message containing a first field to represent a maximum traffic-to-pilot ratio, and a second field to represent a buffer status.

10. The method of claim 9, wherein receiving the reverse request message comprises receiving the reverse request message containing a third field having an identifier to represent at least one of a service instance and a service class associated with the reverse request message.

11. An article comprising at least one storage medium containing instructions that when executed cause a mobile station in a wireless communications network to:
detect that a trigger condition has occurred, the trigger condition comprising one of a power headroom increase at the mobile station exceeding a first value, and a power headroom decrease at the mobile station exceeding a second value;
send, in a reverse wireless link in response to detecting the trigger condition, a message having at least two fields that contain information indicative of a data rate for transmission by the mobile station in the reverse wireless link, the information based on at least one of buffer occupancy and power headroom.

12. The article of claim 11, wherein sending the message in the reverse wireless link comprises sending a message having a first field containing data rate information and a second field for indicating whether the data rate information in the first field is based on buffer occupancy or power headroom.

13. The article of claim 11, wherein sending the message in the reverse wireless link comprises sending a message having a first field containing power-related data rate information and a second field containing buffer-related data rate information.

14. The article of claim 11, wherein sending the message in the reverse wireless link comprises sending a message having a first field containing power-related data rate information and a second field containing buffer occupancy information.

15. The article of claim 11, wherein sending the message in the reverse wireless link comprises sending a message having a first field containing traffic-to-pilot ratio information, a second field containing buffer occupancy information, and a third field containing an identifier of at least one of a service instance and a service class associated with the buffer occupancy information.

16. The article of claim 11, wherein sending the message in the reverse wireless link comprises sending a reverse request message on a code-division multiple access (CDMA) 2000 reverse request channel (R-REQCH).

17. A mobile station comprising:
an interface to communicate with a base station over a wireless link;
a buffer to store data for communication over the wireless link to the base station; and
a controller to send information relating to a status of the buffer and information relating to a data rate over the wireless link to the base station in response to a trigger condition, the trigger condition comprising a current power headroom differing from a previous power headroom by more than a predetermined amount.

18. The mobile station of claim 17, wherein the controller is adapted to send data in the buffer on a reverse packet data channel (R-PDCH).

19. The mobile station of claim 18, wherein the controller is adapted to send the information relating to the status of the buffer and information relating to the data rate over the wireless link in a reverse request message on a reverse request channel (R-REQCH).

20. The mobile station of claim 19, wherein R-REQCH is a code-division multiple access (CDMA) 2000 R-REQCH.

21. The method of claim 1, wherein the trigger condition corresponds to an amount of power headroom increase at the mobile station being greater than a value of the first parameter, or an amount of power headroom decrease being greater than a value of the second parameter.

22. The article of claim 11, wherein the instructions when executed cause the mobile station to receive a first trigger parameter containing the first value and a second trigger parameter containing the second value.

23. The article of claim 22, wherein the instructions when executed cause the mobile station to receive at least one other trigger parameter corresponding to another trigger condition, the at least one other trigger parameter indicating a maximum duration between sending the message, the message also being communicated by the mobile station in response to occurrence of the at least one other trigger condition.

24. The mobile station of claim 17, the interface to receive, from the base station, at least one trigger parameter indicating the predetermined amount.

* * * * *